Patented May 4, 1926.

1,583,759

UNITED STATES PATENT OFFICE.

FRANK C. MATHERS, OF BLOOMINGTON, INDIANA, ASSIGNOR TO NATIONAL LIME ASSOCIATION, OF WASHINGTON, DISTRICT OF COLUMBIA, A CORPORATION OF THE DISTRICT OF COLUMBIA.

PROCESS OF TREATING LIME AND PRODUCT DERIVED THEREFROM.

No Drawing. Application filed August 22, 1922. Serial No. 583,653.

*To all whom it may concern:*

Be it known that I, FRANK C. MATHERS, citizen of the United States, residing at Bloomington, in the county of Monroe and State of Indiana, have invented certain new and useful Improvements in Processes of Treating Lime and Products Derived Therefrom, of which the following is a specification.

This invention relates to the treatment of lime, more particularly it relates to the treatment of lime to regulate the settling properties of the hydrate, as will hereinafter be pointed out.

In some industries, for example in the making of paper, a milk of lime is required which settles rapidly. In others, a slow settling lime is needed. In the manufacture of white wash, the latter property is essential. Several factors greatly influence the rate of settling, some increasing and others decreasing it. I have found that the rate of settling may be regulated by using the proper conditions as will be understood by reference to following specification.

Kohlschutter and Walther, Z. f. Electrochemie, vol. 25, page 159, and succeeding pages, give the results of experiments upon the settling of limes. Their experiments in general consisted in slaking quicklime with an aqueous solution of varying concentration of an organic or inorganic compound, to produce a wet hydrate.

Among the concentrations used were normal, one-half normal and one-fourth normal solutions. Their experiments in general consisted in treating 0.56 gram of quicklime with 10 c. c. of the slaking solution. A normal solution of the slaking liquid, contained an amount of salt equivalent to the lime. When solutions of these concentrations are used containing for example, either, calcium chlorid, oxalic acid or sodium carbonate, the reaction of the same with the lime probably results in the production as a reaction-product of calcium oxychloride, calcium oxalate or calcium carbonate and therefore the rate of settling of these substances are tested instead of lime. Using more dilute slaking solutions, the corresponding product is a mixture of lime and the reaction-products. In their experiments an excess of water was used with the resultant production of wet hydrates which settled slowly, even when dilute solutions of the chemical compounds were used. They employed lime made by heating pure calcium oxalate, calcium carbonate or calcium hydroxid. Although normal, one-half normal and one-fourth normal solutions of the alkaline-earth chlorids, for example, calcium chlorid, gave faster settling than pure water the rate of settling does not anywhere near approximate that obtained by my process. The less concentrated solution gave a slower settling than that occurring when using pure water. The use of the more concentrated slaking solutions is not practical for commercial work. The use of dilute solutions, according to these investigations resulted in a slower settling rate. These conclusions were reached because the investigators were experimenting relative to the settling power of hydrates slaked with an excess of water to a wet condition and not with hydrates slaked to a substantially dry powder. When quicklime is slaked with a limited amount of water, a dry hydrate is produced. The amount of water is that chemically necessary to hydrate the lime and compensate for the usual evaporation losses. If an excess of water is used, a wet hydrate results. I have found that a relatively fast settling hydrate may be produced by slaking to a dry hydrate with a slaking medium, preferably an aqueous slaking solution, containing a small proportion of a settling accelerator, preferably an alkaline-earth chloride, for example, calcium chloride. However, it is to be distinctly understood that this is only the preferred group of substances since it gives the most favorable results. Other substances, which while effective, give slightly less favorable results are barium chloride, sodium chloride, aluminum nitrate, etc. It is usually desired to concomitantly with fast settling produce a hydrate which settles to the smallest volume in the shortest time and my invention in its preferred embodiment includes this feature.

In order that my invention may be clearly understood, the data upon which it is based is set forth under appropriate titles.

Method of experiment.

The rate of settling was determined as follows: Ten grams of the hydrate were placed in a tall 100 cc. graduated cylinder having an internal diameter of 23 mm. and 75 cc. of water was added. The cylinder was shaken until the hydrate was in complete suspension, and water was added to a total of 100 cc. The cylinder was again shaken until uniform mixing was obtained, and was then allowed to stand quietly. The top of the lime suspension was read at regular intervals.

In stating the settling results it is necessary that the tables include final volume. A lime may settle rapidly for a short time and show a high settling rate. However, the final volume may be large and the lime would therefore not be a "good settling" lime. Therefore it is necessary to examine the entire settling table in order to determine the lime that settles to the smallest volume in the shortest time.

The analyses of the limes hereinafter referred to by number are as follows:

| Sample No. | 5 | 38 | 52 | 63 | 71 | 107 | 111 |
|---|---|---|---|---|---|---|---|
| Calcium oxide | High calcium | 98.34 | Magnesium lime | High calcium | 57.55 | 94.92 | 60.02 |
| Magnesium oxide | | | | | 39.66 | 1.70 | 39.50 |
| Silica | | .82 | | | .36 | 1.50 | .25 |
| Iron and alumina | | .48 | | | .62 | .94 | .23 |
| Loss and undetermined | | .29 | | | .85 | | |

Effect of slaking to a dry hydrate and to a wet hydrate.

A quick lime slaked to a dry hydrate settles at a greater rate than if it had been slaked to a wet hydrate with excess water and never allowed to dry. For example, a portion, ground to 40 mesh and weighing 8.25 grams (a quantity equivalent to 10 grams of hydrate), of each of the quicklimes numbers 5, 63, 38 and 111 was slaked to dry hydrates. This was done by placing the quicklime in beakers in an oil bath heated to 110° C. (230° F.). Then 8 cc. of water was added to each and thoroughly stirred. After the slaking was completed, the beakers containing the hydrates were left in the hot bath until the hydrates were completely dry.

Next, 8.25 grams samples of the same quicklimes were slaked to wet hydrates by addition to 50 cc. of warm water. Readings of the settling rates were made every five minutes, but the tables here give only the readings after 5, 15, 30, 60 and 120 minutes, and the final, after 24 hours. Using a 100 c. c. graduated cylinder, as stated, the numbers under the time headings indicate how far the precipitate has settled in a given time. For example, considering example No. 5, after 5 minutes, the line of demarcation between the solid matter and the liquid was at 97 c. c. The following results were obtained:

Table I.

Wet hydrates (slaked excess of hot water).

| Sample No. | 5 min. | 15 min. | 30 min. | 60 min. | 120 min. | 24 hrs. |
|---|---|---|---|---|---|---|
| | c. c. | c. c. | c. c. | c. c. | c. c. | c. c. |
| 5 | 97 | 91 | 82 | 57 | 50 | 40 |
| 63 | 96 | 89 | 78 | 50 | 42 | 39 |
| 38 | 96 | 87 | 75 | 45 | 34 | 34 |
| 111 | 97 | 90 | 82 | 57 | 48 | 38 |

Slaked to dry hydrate.

| Sample No. | 5 min. | 15 min. | 30 min. | 60 min. | 120 min. | 24 hrs. |
|---|---|---|---|---|---|---|
| | c. c. | c. c. | c. c. | c. c. | c. c. | c. c. |
| 5 | 92 | 75 | 56 | 32 | 32 | 32 |
| 63 | 83 | 55 | 35 | 29 | 29 | 29 |
| 38 | 86 | 63 | 40 | 25 | 25 | 25 |
| 111 | 86 | 64 | 42 | 26 | 26 | 26 |

The effect of temperature of the quicklime at the time of slaking in excess water.

A hydrate was produced by dropping 8.25 grams of quicklime No. 5, heated to redness into 50 cc. of boiling water (see No. 1, Table II). Another portion of the cold quicklime was added to 50 cc. cold water. The temperature was 30° C. (86° F.) at the end of slaking (No. 2). Another portion of red hot quicklime was dropped into 50 c. c. of water and ice at 0° C. (32° F.) in a vessel which was packed in snow and salt. After slaking the water was at a temperature of 5° C (41° F.) (No. 3). The results are:

Table II.

| | 5 min. | 15 min. | 30 min. | 60 min. | 120 min. | 24 hrs. |
|---|---|---|---|---|---|---|
| | c. c. | c. c. | c. c. | c. c. | c. c. | c. c. |
| No. 1 | 93 | 84 | 71 | 54 | 32 | 32 |
| No. 2 | 97 | 91 | 82 | 58 | 50 | 40 |
| No. 3 | 97 | 94 | 85 | 65 | 55 | 38 |

This shows that the lower the temperature at which slaking occurs, the slower will the hydrate produced settle. This may be due to the fact that the hydrate produced at the lower temperatures contains more water. A possible formula is $Ca(OH)_2 \cdot XH_2O$ where X is greater the lower the temperature at which this reaction takes place. This would also explain why the "dry hydrates"

settled so much faster than the wet hydrates formed with excess water. The dry hydrates produced were heated to 110° C. (230° F.), and this probably drove off all of the excess water. Any water incorporated in the "wet hydrate" would remain and would make the hydrate settle more slowly. The slowness of settling may not be due to slowness of slaking since in No. 3 the hot quicklime seemed to slake nearly instantly but settled the most slowly.

*The effect of using dilute solutions of chemicals in slaking.*

Ten grams of the quicklime were ground to 40 mesh, and thereafter slaked with ten cc. of the solution, (equal weights of lime and solution). The beaker containing the lime was kept at 110° in an oil bath during the slaking, and until the hydrate was dry. Ten grams of this hydrate after sieving through 80 mesh was taken for each experiment. Generally, the hydrates were easily shaken through the sieve without grinding or rubbing. The two factors of interest here are the rate of settling and the total final volume of the suspension. The amount of settling varied as much as did the rate of settling. Table III shows; 1st, the limes slaked with the one per cent sugar solution had the largest final volume except in case of No. 71, where the commercial hydrate 71A had the largest final volume. 2nd, in all cases except one, the sugar gave the lowest rate of settling and here the settling was rapid for a short time while the total volume settled was very little. 3rd, the limes slaked with calcium chloride settled fastest and also had the smallest final volumes in all cases. 4th, aluminum nitrate acted in the same way as calcium chloride except to a less degree. 5th, there was a large difference between the rate of settling of the commercial hydrates and of the hydrates slaked with pure water under the conditions of slaking used. In these experiments, limes 71 and 111 are dolomites but in settling they act similarly to the high calcium limes, when chemical solutions are used. This indicates that chemical solutions have the same effect upon dolomite limes as they do on high calcium limes.

*Table III.*

| Lime used. | Equal weights of the following solutions. | Min. 5 | Min. 10 | Min. 20 | Min. 30 | Min. 45 | Min. 60 | Min. 75 | Min. 120 | Final volume. |
|---|---|---|---|---|---|---|---|---|---|---|
| 38 high calcium | Pure water | 93 | 96 | 74 | 63 | 50 | 42 | 34 | 29 | 29 |
| | 1% sugar | 95 | 90 | 82 | 74 | 63 | 57 | 48 | 40 | 40 |
| | 1% calcium chloride | 72 | 46 | 29 | 22 | 22 | 22 | 22 | 22 | 22 |
| | 1% aluminum nitrate | 89 | 78 | 57 | 40 | 32 | 25 | 25 | 25 | 25 |
| | Commercial hydrate | 86 | 73 | 53 | 40 | 28 | 25 | 24 | 24 | 24 |
| 5 high calcium | Pure water | 92 | 83 | 68 | 56 | 43 | 32 | 30 | 30 | 30 |
| | 1% sugar | 94 | 89 | 76 | 64 | 52 | 49 | 40 | 38 | 38 |
| | 1% calcium chloride | 80 | 66 | 44 | 30 | 26 | 26 | 26 | 26 | 26 |
| | 1% aluminum nitrate | 88 | 78 | 63 | 48 | 32 | 28 | 28 | 28 | 28 |
| | Commercial hydrate | Not available. | | | | | | | | |
| 107 dolomite | Pure water | 88 | 76 | 55 | 41 | 32 | 31 | 31 | 31 | 31 |
| | 1% sugar | 89 | 78 | 59 | 56 | 56 | 56 | 56 | 56 | 56 |
| | 1% calcium chloride | 83 | 66 | 40 | 28 | 25 | 25 | 25 | 25 | 25 |
| | 1% aluminum nitrate | 88 | 66 | 42 | 29 | 27 | 27 | 27 | 27 | 27 |
| | Commercial hydrate | 90 | 80 | 63 | 49 | 35 | 28 | 28 | 28 | 28 |
| 71 dolomite | Pure water | 75 | 49 | 32 | 28 | 25 | 24 | 24 | 24 | 24 |
| | 1% sugar | 94 | 88 | 78 | 65 | 51 | 40 | 35 | 27 | 27 |
| | 1% calcium chloride | 55 | 28 | 23 | 22 | 22 | 22 | 22 | 22 | 22 |
| | 1% aluminum nitrate | 75 | 38 | 26 | 23 | 22 | 22 | 22 | 22 | 22 |
| | Commercial hydrate | 86 | 75 | 61 | 47 | 34 | 31 | 31 | 31 | 31 |

Other chemical solutions have an effect upon settling as is shown in Table IV. The samples were slaked and dried in an oil bath at 125° C. (257° F.). The slaking was done by adding 10 cc. of the one per cent solutions named on 10 grams of quicklime 63.

*Table IV.*

| Slaking agent. | 5 min. | 15 min. | 30 min. | 60 min. | 120 min. | 24 hrs. |
|---|---|---|---|---|---|---|
| Blank | 72 | 48 | 45 | 43 | 43 | 43 |
| Sodium carbonate | 93 | 76 | 57 | 46 | 46 | 46 |
| Barium chloride | 69 | 33 | 33 | 33 | 33 | 33 |
| Borax | 88 | 60 | 58 | 58 | 58 | 58 |
| Table salt | 68 | 56 | 54 | 54 | 54 | 54 |
| Sodium acetate | 88 | 59 | 42 | 37 | 37 | 37 |
| Rochelle salt | 85 | 52 | 52 | 52 | 52 | 52 |

*Effect of chemical solutions upon already formed lime hydrates.*

Adding solutions of chemicals to a milk of lime has very little influence upon its rate of settling. The rate of settling may be increased or decreased to a slight extent but the amount of chemical agent necessary to bring about this change is too great to warrent its use. Small amounts of chemicals have little effect while larger amounts have a greater effect. The chemicals which have the greatest effect on settling in this case are different from the ones used in slaking, and it seems that the ones added to the milk of lime suspension must react chemically with it in order to change its rate of settling. A large number of these experiments was tried out only the following using lime No. 63 need be given since they are typical.

Table V.

| Time in minutes. | 5 | 15 | 30 | 60 | 120 | 24 hrs. |
|---|---|---|---|---|---|---|
| Nothing added | 91 | 76 | 53 | 29 | 27 | 27 |
| 1 gram hydrochloric acid added | 85 | 64 | 42 | 29 | 29 | 29 |
| 1 gram sulphuric acid added | 97 | 97 | 64 | 49 | 31 | 31 |
| 1 gram sugar added | 91 | 73 | 49 | 29 | 27 | 27 |
| 1 gram oxalic acid | 89 | 71 | 48 | 28 | 28 | 28 |

Since ten grams of hydrated lime was used in each of these tests, it is seen that one gram of chemical substance is equivalent to ten per cent by weight of the lime used. It is apparent that this treatment would be impractical on a commercial scale. Smaller quantities of the chemicals showed no noticeable action. From the table it is to be noted that the hydrochloric acid increases the rate of settling while sulphuric acid decreases it. The sugar and oxalic acid have less effect than the others, but they increase the settling to a very slight extent.

From a review of the above, it is clear that the simplest and best manner of designating the settling power of limes is to compare the volume of the lime-suspension at the end of different time-periods. Thirty minutes forms for fast settling limes a satisfactory time-period. It appears from a consideration of the experimental results that when dry lime hydrate prepared as set forth is mixed with water in the proportion of 10 grams to a total volume of 100 c. c. in a container having an internal diameter of 23 mm. the line of demarcation between the clear and clouded parts of the fluid is approximately at less than thirty centimeters at the end of thirty minutes. Specifically, it appears that the line of demarcation varies between 22 and 30 c. c. considering the 30 and 60 minute time-periods.

I claim:

1. A milk of lime suspension containing a fast settling lime hydrate, said hydrate being characterized by the property of settling quicker than that prepared by slaking with an excess of water.

2. A milk of lime suspension containing a fast settling lime hydrate, said hydrate being prepared by slaking lime to a dry hydrate in the presence of settling accelerator.

3. A milk of lime suspension containing a fast settling hydrate, said hydrate being prepared by slaking lime to a dry hydrate in the presence of an aqueous solution of alkaline earth chlorid.

4. A milk of lime suspension containing a fast settling hydrate, said hydrate being prepared by slaking lime to a dry hydrate in the presence of an equal weight of 1 per cent solution calcium chlorid.

5. A milk of lime suspension containing a fast settling hydrate, said hydrate being prepared by slaking lime to a dry hydrate in the presence of an equal weight of 1 per cent solution of an alkaline earth chlorid.

6. The herein described milk of lime suspension containing a rapid settling hydrate of lime distinguished by the fact that when the hydrate is mixed with water in the proportion of 10 grams to a volume of 100 cc. in a container having an internal diameter of 23 mm., the line of demarcation between the clear and clouded parts of the fluid is at less than 30 cc. at the end of thirty minutes.

7. The herein described milk of lime suspension containing a rapid settling hydrate of lime distinguished by the fact that when the hydrate is mixed with water in the proportion of 10 grams to a volume of 100 cc. in a container having an internal diameter of 23 mm., the line of demarcation between the clear and clouded parts of the fluid is approximately between 22 and 30 cc. at the end of 30 minutes.

8. The herein described milk of lime suspension containing a rapid settling hydrate of lime distinguished by the fact that when the hydrate is mixed with water in the proportion of 10 grams to a volume of 100 cc. in a container having an internal diameter of 23 mm., the line of demarcation between the clear and clouded parts of the fluid is approximately between 22 and 30 cc. at the end of 30 minutes and below 26 cc. at the end of 60 minutes.

9. The herein described milk of lime suspension containing a fast settling hydrate of lime distinguished by the fact that when the hydrate is mixed with water in the proportion of 10 grams to a total volume of 100 cc. in a container having an internal diameter of 23 mm., the line of demarcation between the clear and the clouded parts of the fluid is approximately between 22 and 30 cc. at the end of 30 minutes and approximately between 22 and 25 cc. at the end of 60 minutes.

10. The herein described milk of lime suspension containing a lime hydrate settling rapidly to one-third of its original volume in approximately 30 minutes.

11. An aqueous lime suspension containing a rapid settling lime hydrate distinguished by the fact that when 10 grams of the hydrate is present in a total volume of 100 cc., the line of demarcation between the clear and clouded parts of the fluid is approximately between 22 and 30 cc. at the end of thirty minutes when measured in a container having an internal diameter of 23 mm.

In testimony whereof I hereunto affix my signature.

FRANK C. MATHERS.